(12) United States Patent
Landwehr (10) Patent No.: US 11,045,963 B2
(45) Date of Patent: Jun. 29, 2021

(54) KNIFE WITH PRESSURE INDICATION

(71) Applicant: Thomas Jay Landwehr, DePere, WI (US)

(72) Inventor: Thomas Jay Landwehr, DePere, WI (US)

( * ) Notice: Subject to any disclaimer, the term of this patent is extended or adjusted under 35 U.S.C. 154(b) by 0 days.

(21) Appl. No.: 15/185,163

(22) Filed: Jun. 17, 2016

(65) Prior Publication Data

US 2017/0361474 A1 Dec. 21, 2017

(51) Int. Cl.
*B26B 11/00* (2006.01)
*B26B 3/00* (2006.01)
*G01L 5/00* (2006.01)
*G08B 21/18* (2006.01)

(52) U.S. Cl.
CPC ............. *B26B 11/008* (2013.01); *B26B 3/00* (2013.01); *G01L 5/0038* (2013.01); *G08B 21/182* (2013.01)

(58) Field of Classification Search
CPC ....... B26B 11/008; B26B 3/00; G01L 5/0038; G08B 21/182
See application file for complete search history.

(56) References Cited

U.S. PATENT DOCUMENTS

| | | | | |
|---|---|---|---|---|
| RE30,757 E | * | 10/1981 | Gerber | B26D 5/00 83/174 |
| 4,385,443 A | * | 5/1983 | O'Banion | B23D 49/165 30/393 |
| 6,460,251 B1 | * | 10/2002 | Orloff | B26B 21/4056 30/34.05 |
| 6,708,408 B2 | * | 3/2004 | Orloff | B26B 21/4056 30/34.05 |
| 2004/0098862 A1 | * | 5/2004 | Orloff | B26B 21/222 30/41.7 |
| 2006/0135321 A1 | * | 6/2006 | Chen | A63B 5/11 482/27 |
| 2006/0288829 A1 | * | 12/2006 | Sipperly | B26B 11/00 83/13 |
| 2007/0101580 A1 | * | 5/2007 | Fossella | B26B 5/00 30/162 |
| 2008/0009225 A1 | * | 1/2008 | Barthold | A63H 33/00 446/486 |
| 2008/0168657 A1 | * | 7/2008 | Cloke | B26B 21/4056 30/32 |
| 2008/0268397 A1 | * | 10/2008 | Graham | A61B 17/1626 433/3 |
| 2009/0255418 A1 | * | 10/2009 | Rummel | B26D 5/00 99/537 |
| 2012/0220430 A1 | * | 8/2012 | Bucar | A63B 69/32 482/84 |
| 2014/0309856 A1 | * | 10/2014 | Willson-Quayle | B60Q 1/444 701/36 |
| 2016/0167241 A1 | * | 6/2016 | Goldfarb | B26B 21/4056 382/108 |

* cited by examiner

*Primary Examiner* — Ghassem Alie
*Assistant Examiner* — Fernando A Ayala
(74) *Attorney, Agent, or Firm* — Donald J. Ersler (57) ABSTRACT

A knife with a pressure indication means with a sensor which is actuated when the cutting edge is forced onto a material, a processing means receiving a signal from said sensor and sending a signal to a notification means indicating the pressure as soon as a predefined condition is met.

18 Claims, 8 Drawing Sheets

KNIFE WITH PRESSURE INDICATION

FIELD OF THE INVENTION

The present invention relates to a cutting hand tool with pressure indication for indicating the pressure or force applied while using the tool.

BACKGROUND OF THE INVENTION

Industrial knives have to meet much higher standards than the ordinary knives individuals use in their kitchen. Productivity, and therefore cutting efficiency, need to be kept constant and at a high level. While some industrial plants run 24/7, the lifetime of a blade subjected to intensive use may not exceed a few hours until its cutting edge becomes unsuitably dull. The useful lifetime of a blade depends on the blade material and the material the knife is being used to cut. A blunt blade represents a waste of time and energy, since more force and more time is required to achieve the same result. In addition, a cutting edge may not wear out uniformly, result in dents and nicks in the cutting edge. These in turn can no longer produce a clean cut and the material cut by the blade may be torn instead of cut. Eventually, the knife cannot be used any more and the blade or the complete knife has to be discarded.

In the context of a hand-held cutting tool, dull blades not only slow down or compromise the quality of the cutting process. The extra force required for cutting also intensifies the strain in the user's hand and arm and may cause musculoskeletal disorders, more commonly known as Repetitive Strain Injuries (RSI). RSI are classified as occupational diseases in most developed countries.

In addition, the extra force required during the cut when using a dull blade increases the risk of slipping and also the level of severity of the potentially resulting injury may be higher. Therefore, it is desirable to monitor the sharpness of the blade's cutting edge in order to identify the stage at which it is no longer suitable for cutting. However, the sharpness of the blade declines gradually and it is difficult for the user to determine when the blade or knife should be replaced. In some cases a visual check of the blade may be sufficient to determine if it is still sharp enough for cutting. However in the case of a uniform wear of the cutting edge of the blade the difference between a sharp cutting edge and a dull blade cannot be determined by the users eye.

SUMMARY OF THE INVENTION

The main object of the present invention is to provide a cutting hand tool including a means for indicating the amount of pressure being applied on the hand tool while it is being used, in order to allow the user to decide when the blade or hand tool must be replaced.

Another object is to provide a means of showing if a knife or blade is sharp enough for performing a clean cut.

A further object is monitoring the use of several cutting hand tools to compare the pressure difference for different applications or by different users.

DETAILED DESCRIPTION OF THE INVENTION

A preferred embodiment of a cutting tool with pressure indication is described according to the drawings. This preferred embodiment is to be understood as an exemplary embodiment and any detailed description shall not be interpreted as limiting. Alternate embodiments obvious to one skilled in the art will not be described in detail or will be omitted to prevent the relevant details of the invention to be overlooked.

Figure 1:
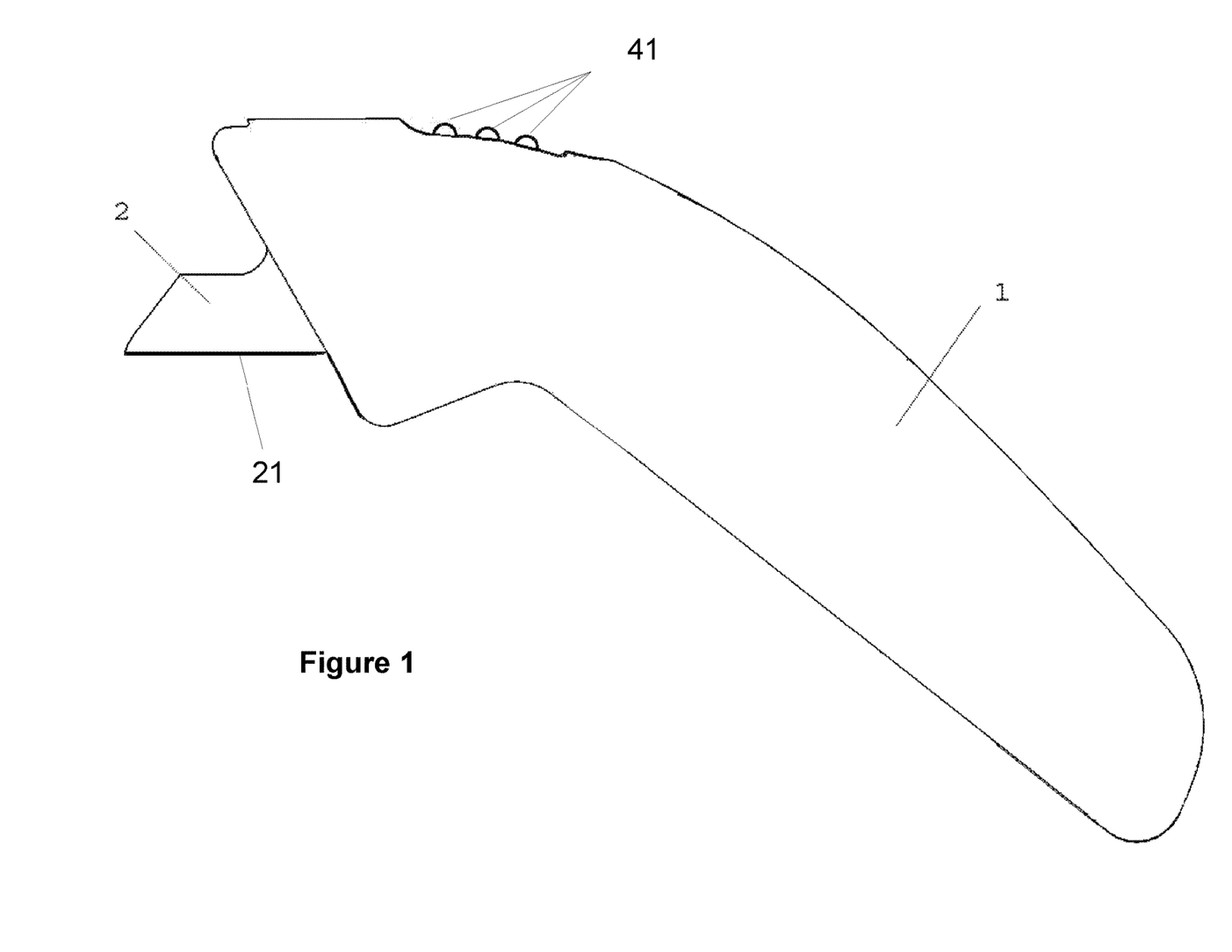
FIG. 1: Side view of the cutting hand tool

FIG. 1 shows that the proximal part of the housing 1 has an elongated handle-like shape suitable for gripping with the hand. The blade 2 protrudes out of the distal end of the knife and its lower edge 21 is the cutting edge. During the operation of the knife, the user grips the proximal part of the housing 1 and exerts pressure on the object to be cut via the cutting edge 21. This pressure is measured with a sensor 3 and the pressure information is processed by a processing means 4. Then, a notification means 41 provides a feedback to the user about the pressure applied on the cutting edge 21.

Any type of notification means 41 may be used, as long as the signal it emits can be noticed by the user and is related to the force he is applying to the knife.

Figure 2A:
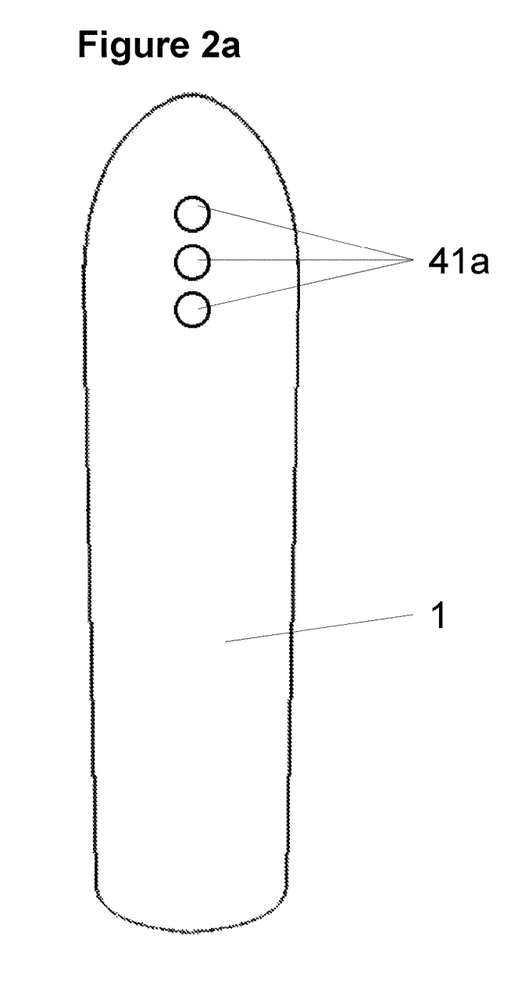
FIG. 2a: Top view of the cutting hand tool where the notification means are lights
Figure 2B:
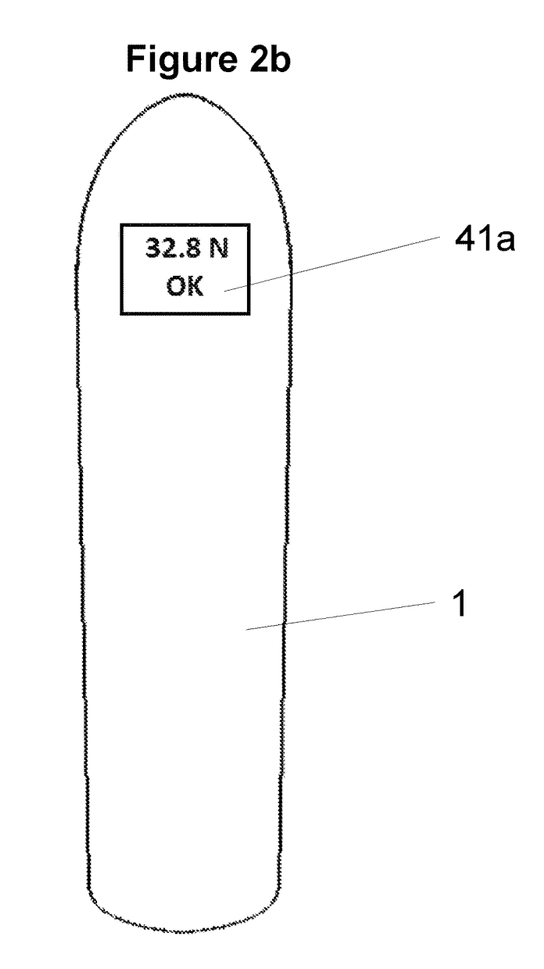
FIG. 2b: Top view of the cutting hand tool where the notification means is a display

The notification means 41 may be a visual indicator 41a, comprising lights or a display as shown in FIGS. 2a and 2b. The location of visual indicators 41a should be chosen in order to enable their visibility by the user, usually at the top of the distal part of the knife, as shown in FIGS. 1, 2a and 2b. In cases where a quantitative monitoring is desired, the exact value of the pressure can be shown on a display (FIG. 2b). Various types of displays can be used, e.g. LCD or LED displays. Alternatively, qualitative information on the pressure applied to the tool may be displayed by lighting different numbers of lights or lights of different colors (FIG. 1 and FIG. 2a).

Figure 2C:
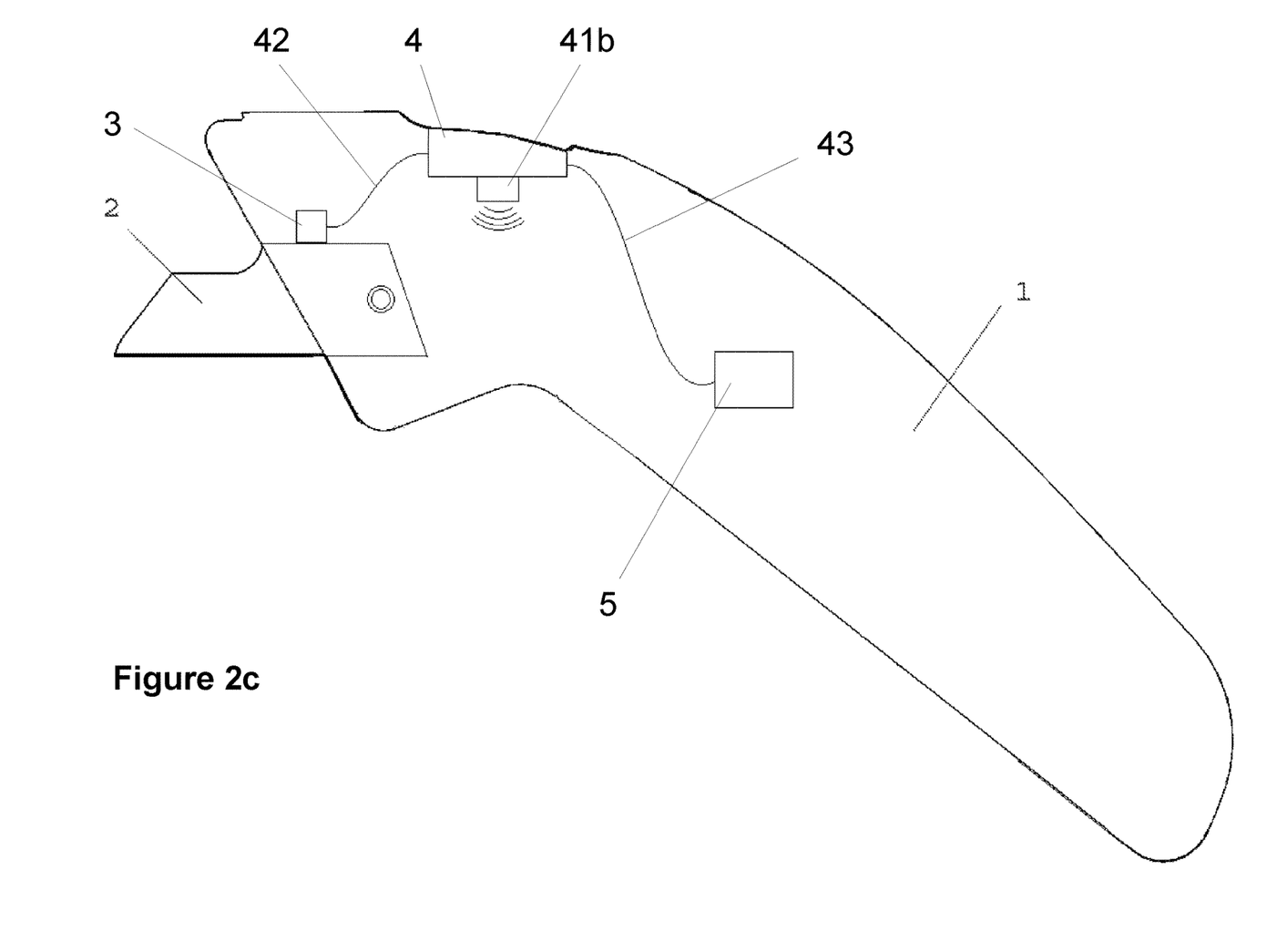
FIG. 2c: Cutting hand tool where the notification means is a sound source
Figure 2D:
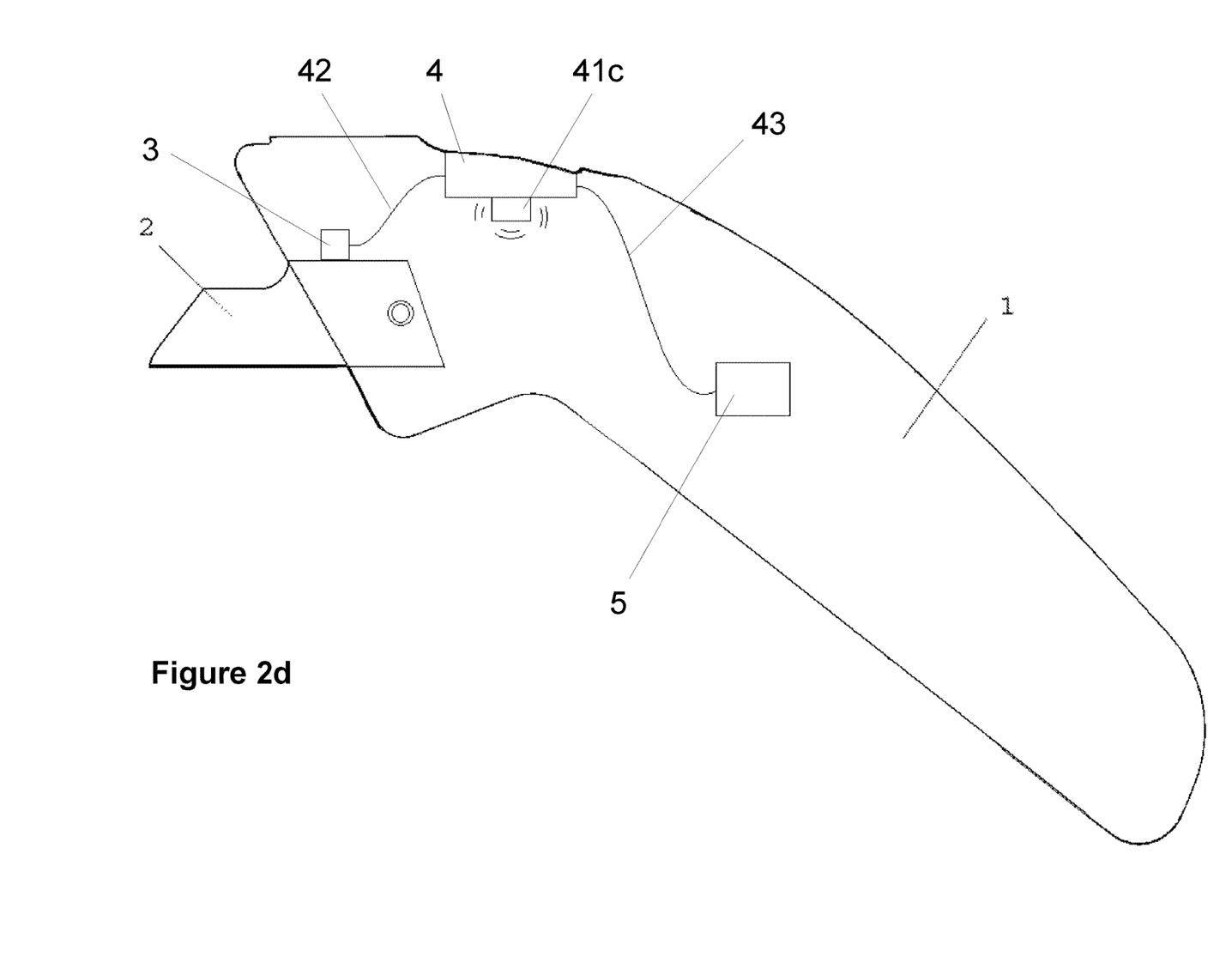
FIG. 2d: Cutting hand tool where the notification means produces vibrations

The housing 1 may also contain a sound source 41b like a buzzer or bell (FIG. 2c) or a vibrating means 41c such as a vibration motor (FIG. 2d). For the comfort of the user, vibrations or sounds should only be generated if the pressure exceeds a certain threshold. However, these acoustic and tactile notification means 41b, 41c could also be implemented to increase in volume with increasing pressure beyond a certain threshold. This can force the user to immediately stop the activity due to the discomfort created.

Figure 2E:
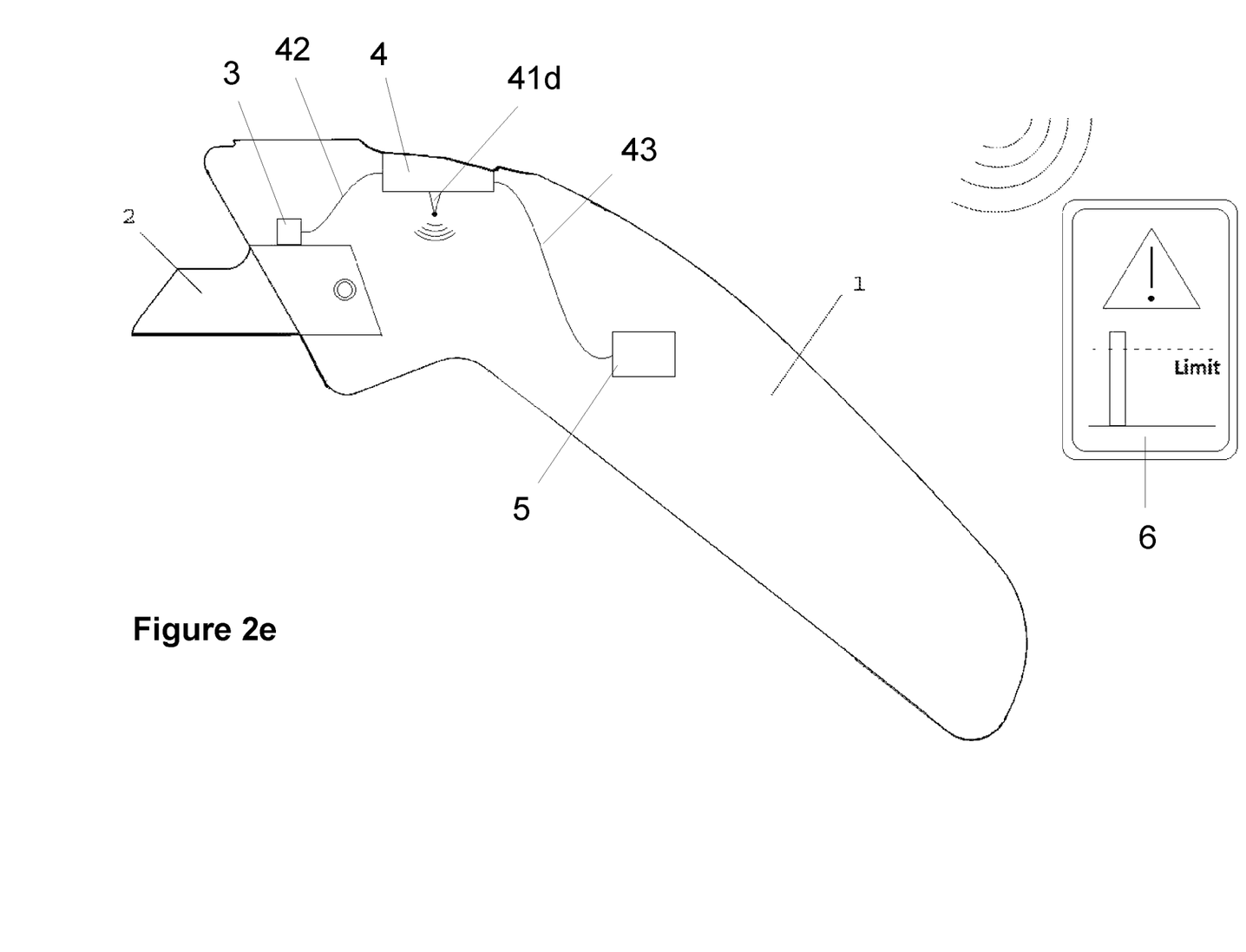
FIG. 2e: Cutting hand tool where the notification means emits an electromagnetic signal

A further possibility is the transmission of the pressure information wirelessly to a readout device 6 such as a display or a smartphone (FIG. 2e). This transmission may be a simple RF signal or use various other technologies like Bluetooth or NFC. Several knives may be connected to the same readout device 6, thus allowing a centralized monitoring of the operation of several tools. In such an implementation, it is important that the signal emitted by each knife is distinct from the others in order to be able to identify them. For example, the signal may contain a unique number for each knife. The readout device 6 may be located in the manager's office or by the maintenance division. In this embodiment, the cutting tool could automatically notify the maintenance division that the blade is dull and needs to be replaced. Likewise, the production line manager could detect incorrect uses of the knife, e.g. a user exerting an excessive force that could lead to RSI (Repetitive Strain Injuries) or non-conform cuts due to careless operation of the user. This monitoring may also serve quality management purposes: by monitoring the lifetime of the blades, the manager may identify defective blade batches or variations in quality between different blade suppliers.

In a more complex embodiment a combination of one or more of the notification means described above, especially a combination of a local notification means on the cutting hand tool and a wireless transmission of the pressure information.

There are several ways to detect the force applied on the blade by the user.

Figure 3:
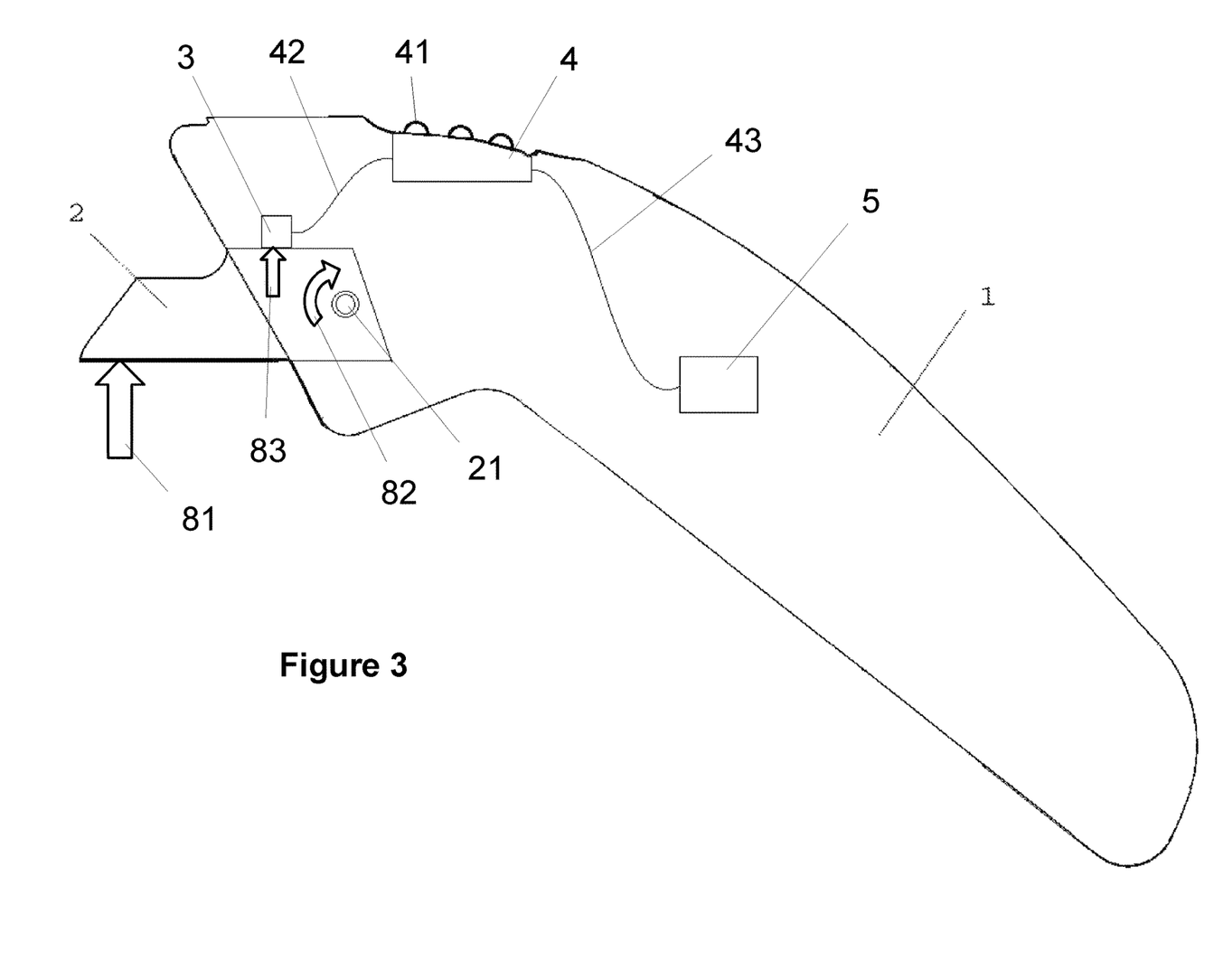
FIG. 3: Cutting hand tool with a movable blade and a pressure sensor

In one embodiment, the blade 2 can be movably attached to the housing 1, in a manner allowing a small movement of the cutting edge 21 when it is forced onto the material. FIG. 3 shows the example of a blade 2 which is pivotally fixed to the housing 1 around the pivot point 21. When the cutting edge 21 is forced onto the material, a force 81 is applied to the blade 2, which causes its rotation as shown by arrow 82 until it reaches the pressure sensor 3. So, the pressure sensor 3 is subjected to a force 83 proportional to the force 82 applied by the user on the blade 2. Potentiometric, capacitive, piezoelectric or any other common type of sensor 3 may be used.

Figure 4:
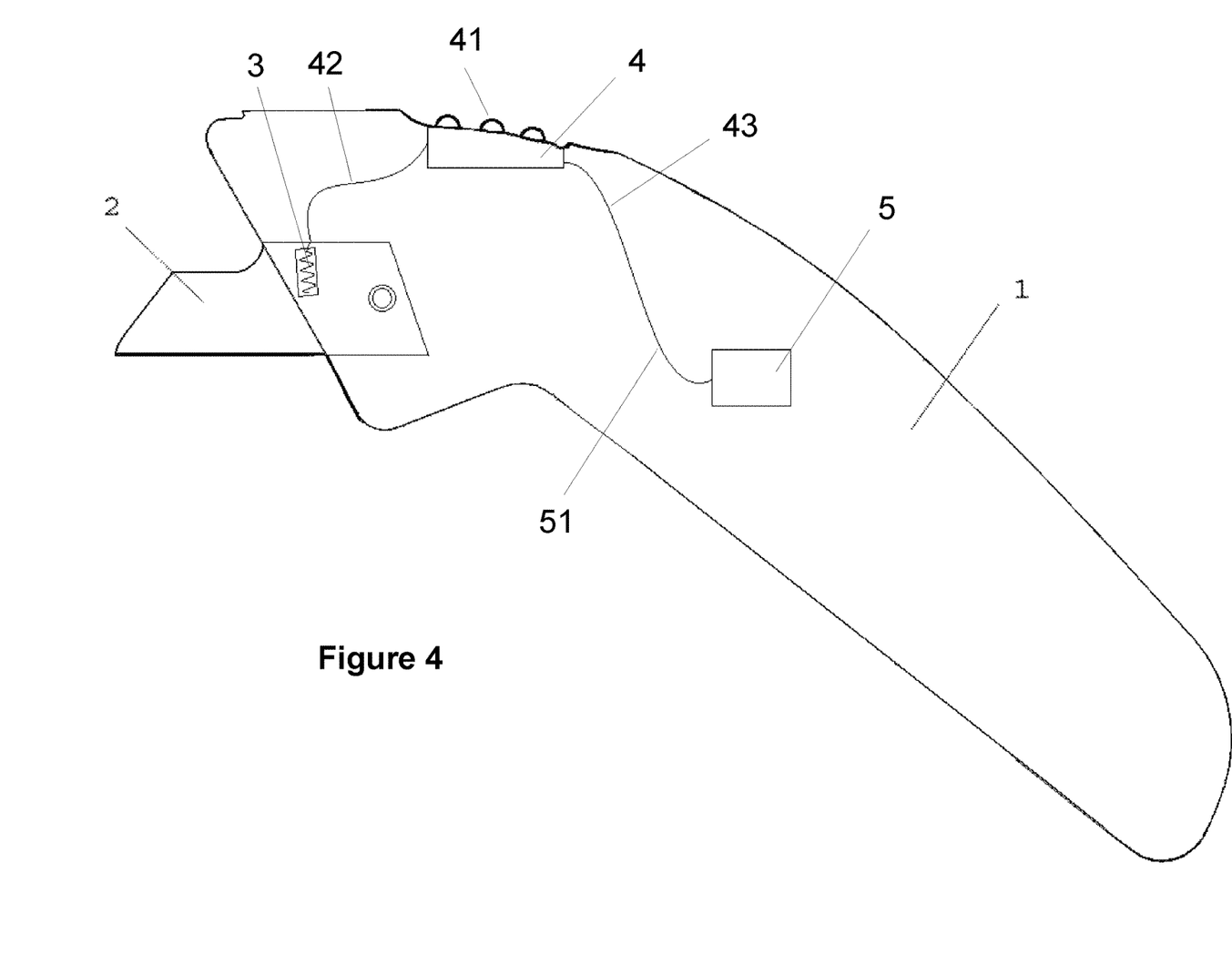
FIG. 4: Cutting hand tool with a fixed blade and a strain gauge
Figure 5:
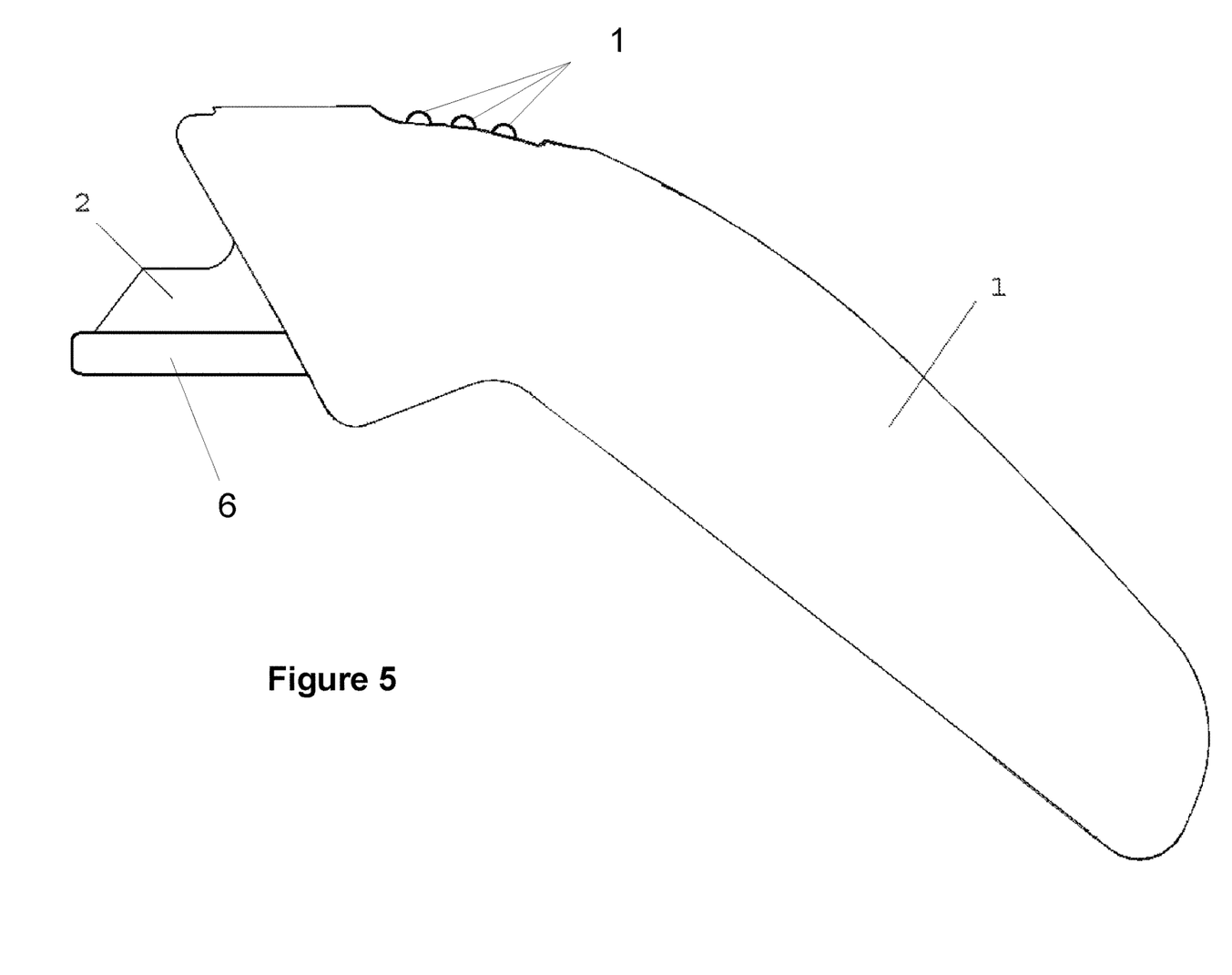
FIG. 5: Cutting hand tool with blade guard

In another embodiment shown FIG. 4, the force applied to the blade 2 can be directly measured on the blade 2 itself by monitoring its deformation with a strain gauge 3. In this embodiment the force exerted on the blade can be easily deducted from the value of the strain since these two values are proportional and the blade's strain/force proportionality coefficient can be found by a simple calibration procedure. The advantage of this option is that it doesn't require any movement of the blade 2, allowing the blade to be fastened firmly to the housing 1, which provides a better stability during the cut. Strain gauges 3 are cheap and easy to implement since they just need to be fixed to the surface of the blade 2.

In the presented invention, the sensor 3 interacts with a processing means 4 via a connection 42. This processing means 4 analyzes the signal delivered by the sensor 3 and activates the notification means 41 accordingly. In the case of a display 41a, the processing means 4 continuously converts the signal delivered by the sensor 3 into a force value and sends the information to the display 41a. In the case of a binary notification means indicating if the pressure is beyond a threshold value, the processing means 3 only compares the incoming signal to the predetermined threshold, and sends a signal to the notification means 41 if the threshold is reached or exceeded. In one embodiment where the notification means consists of a visual indicator 41a with three diodes, e.g. green, yellow and red, the green one is lit under a first threshold, the red one above a second threshold and the yellow one if the determined pressure value lies between these two values.

The energy required for the operation of the sensor 3, the processing means 4 and the notification means 41 is preferably supplied by a power source 6 located in the housing 1 of the knife. This power source can be a battery or any other common type of accumulator.

This description and the accompanying drawings show exemplary embodiments of the invention. The invention, however, should not be interpreted as being limited to these particular embodiments. Variations of the embodiments can be made by those skilled in the art without departing from the scope of this invention as defined by the claims.

The invention claimed is:

1. A handheld utility knife comprising a housing, a planar cutting blade lying in a blade plane running parallel along an axis of a length of said blade and having at least one cutting edge, said planar cutting blade does not have linear movement along a horizontal axis of said at least one cutting edge relative to said housing, said cutting edge having a front end and a back end, said front end protruding from the housing and said back end completely covered by the housing and a pressure indicating means includes a pressure sensor detecting forces applied to said blade in a direction parallel to said blade plane, said planar cutting blade is connected to the knife in a manner allowing an upward movement of the planar cutting blade, said upward movement of the planar cutting blade being caused by a reaction force applied to said blade in a direction parallel to said blade plane by the material to be cut as a result of said cutting edge being forced onto the material to be cut and wherein said pressure sensor is actuated when said movement occurs, a lengthwise axis of said pressure sensor s parallel to said blade plane of said planar cutting blade, a processing means connected to said pressure sensor and a notification means connected to said processing means wherein said pressure sensor is directly contacted and actuated by the blade as soon as said cutting edge is forced onto a material to be cut and said processing means receives a signal from said pressure sensor and sends a signal to said notification means.

2. The knife of claim 1 wherein said notification means provides a visual or acoustic or tactile or electromagnetic signal related to the pressure being applied to said cutting edge of the blade.

3. The knife of claim 1 wherein said notification means provides a visual signal related to the pressure being applied to said cutting edge of the blade and said visual signal provided by the notification means is shown on a display.

4. The knife of claim 1 wherein said notification means provides a visual signal related to the pressure being applied to said cutting edge of the blade and said visual signal provided by the notification means which includes a plurality of lights showing the amount of pressure applied by lighting additional lights with increasing pressure.

5. The knife of claim 1 wherein said notification means provides a visual signal related to the pressure being applied to said cutting edge of the blade and said visual signal provided by the notification means which includes one or several lights showing different colors depending on the amount of pressure applied.

6. The knife of claim 5 wherein said lights use the colors green, yellow and red.

7. The knife of claim 2 wherein said notification means provides an acoustic signal related to the pressure being applied to said cutting edge of the blade and said acoustic signal is emitted by the notification means when the pressure applied on said cutting edge of the blade reaches a predefined level.

8. The knife of claim 2 wherein said notification means provides an acoustic signal related to the pressure being applied to said cutting edge of the blade and said acoustic signal increases in volume if the pressure applied on said cutting edge is increased beyond a predefined level.

9. The knife of claim 2 wherein said notification means provides a tactile signal related to the pressure being applied to said cutting edge of the blade and said tactile signal is emitted by said notification means in form of an impulse or vibrations when the pressure applied on said cutting edge of the blade reaches a predefined level.

10. The knife of claim 2 wherein said notification means provides an electromagnetic signal related to the pressure being applied to said cutting edge of the blade and said notification means emits said electromagnetic signal by using wireless communication technology, thus allowing said signal to be received by a readout device.

11. The knife of claim 10 wherein said electromagnetic signal includes an identification of the knife, allowing any receiving device to identify different knives.

12. The knife of claim 1 wherein said pressure sensor includes a piezoelectric, potentiometric, capacitive sensor or another usual type of sensor.

13. The knife of claim 1 wherein said pressure sensor is a pressure switch.

14. The knife of claim 1 wherein the energy needed for the operation of said pressure sensor and said processing means is supplied by a power source located in said housing.

15. The knife of claim 14 wherein said power source is a battery.

16. The knife of claim 1 wherein said pressure sensor is in contact with a top edge of said cutting blade.

17. A handheld utility knife comprising:
a housing, a planar cutting blade lying in a blade plane running parallel along an axis of a length thereof and having at least one cutting edge, said planar cutting blade does not have linear movement along a horizontal axis of said at least one cutting edge relative to said housing, said cutting edge having a front end and a back end, said front end protruding from the housing and said back end completely covered by the housing and a pressure indicating means includes a pressure sensor detecting forces applied to said blade in a direction parallel to said blade plane, said planar cutting blade is pivotally connected to the housing at one end to allow upward movement of the planar cutting blade at an opposing end, said pivotal connection includes an axis which is perpendicular to said blade plane of said planar cutting blade, said upward movement of the planar cutting blade being caused by a reaction force applied to said blade in a direction parallel to said blade plane by the material to be cut as a result of said cutting edge being forced onto the material to be cut and wherein said pressure sensor is actuated when said movement occurs, a lengthwise axis of said pressure sensor passes through said cutting edge, a processing means connected to said pressure sensor and a notification means connected to said processing means wherein said pressure sensor is directly contacted and actuated by the blade as soon as said cutting edge is forced onto a material to be cut and said processing means receives a signal from said pressure sensor and sends a signal to said notification means.

18. The knife of claim 17 wherein said pressure sensor is in contact with a top edge of said cutting blade.

* * * * *